United States Patent [19]

Miller et al.

[11] 4,070,697
[45] Jan. 24, 1978

[54] APPOINTMENT CALENDARING CLOCK

[75] Inventors: Leonard W. Miller; James B. Bear, both of Santa Ana, Calif.

[73] Assignee: Leonard W. Miller, Santa Ana, Calif.

[21] Appl. No.: 681,992

[22] Filed: Apr. 30, 1976

[51] Int. Cl.² .................... G11B 23/18; G11B 27/22
[52] U.S. Cl. ...................................... 360/12; 312/237
[58] Field of Search .................... 58/150; 360/12; 179/100.1 C; 312/237

[56] References Cited

U.S. PATENT DOCUMENTS

| | | | |
|---|---|---|---|
| 2,964,370 | 12/1960 | Butler | 312/237 |
| 3,632,880 | 1/1972 | Goldschein | 179/100.1 C |
| 3,647,991 | 3/1972 | Gaon et al. | 179/100.1 C |
| 3,708,632 | 1/1973 | Parilla | 360/12 |

FOREIGN PATENT DOCUMENTS 556,794  4/1957  Belgium ........................ 179/100.1 C

*Primary Examiner*—Jay P. Lucas
*Attorney, Agent, or Firm*—Knobbe, Martens, Olson, Hubbard & Bear

[57] ABSTRACT

An alarm clock which may be embodied in a clock radio includes an audio recording system and apparatus permitting its user at various times to record information regarding future appointments or other scheduling information, the input information being designated with a particular month and day to which it applies. The clock mechanism provides a playback of the various scheduling information provided at different times for a specific date when the alarm rings on that specific date so that the user is notified of his schedule on awakening.

13 Claims, 3 Drawing Figures

APPOINTMENT CALENDARING CLOCK

BACKGROUND OF THE INVENTION

This invention relates to alarm clocks and, more specifically, to an alarm clock incorporating audio recording capability to serve as an appointment calendar for the user.

Digital clock circuits with digitally set alarms are well known in the prior art. These devices typically include a digital clock read-out and a mechanism for setting a particular time of day at which an audible alarm is sounded by the electronic apparatus to awake an individual on a daily basis. Furthermore, clock radios are well known in the prior art, these devices generally substituting the operation of a radio for a normal alarm signal. In addition, timing circuits have been used to enable a variety of devices, and have been used, for example, to operate a tape recorder at a specific time of day. None of these prior art devices, however, permits a user to prerecord messages at different times and to designate the date on which the message is to be played back, so that the alarm system may be used, in addition, as an appointment calendar. It is, of course, well known for people to use a calendar which provides sufficient space to record in writing appointments, etc. Such a system is often inconvenient to use, and does not assure the user that he will be reminded on the appointment date of his schedule.

SUMMARY OF THE INVENTION

The present invention provides a combination of a clock mechanism with an audio recording mechanism and permits the user to introduce at plural unscheduled times information regarding future appointments or scheduling, in each instance designating the month and day on which the recorded information is to be played back. This information is stored in the audio recording mechansim in accordance with the desired playback date and is replayed on that date after the alarm of the clock sounds to remind the user of his appointment or scheduling. Plural recorded messages may be introduced at various times to be played back on a specific date, these messages typically involving different appointments for that date and being played back in succession after the sound of the alarm on that date.

In using the specific embodiment disclosed, an operator first selects the day and data on which a recorded message is to be replayed and first listens to any messages which have been previously recorded for that day to assure that scheduling conflicts are not presented. He is then notified as by an indicator light, that the mechanism is ready to receive his additional message input and he speaks into a microphone to store the scheduling information. The user sets the time of day that he wishes to be awakened, as with any other alarm clock, and at some predetermined time prior to the sounding of the alarm the mechanism moves to a stand-by position to place it in readiness to replay the day's appointment messages. After the sounding of an awakening alarm, the day's messages are replayed and erased. The devices disclosed will accept messages up to a year subsequent to the data that the message is recorded and will store as much as 60 seconds of message information for any particular appointment date.

These and other advantages of the present invention are best understood through a reference to the drawings, in which.

DETAILED DESCRIPTION OF THE PREFERRED EMBODIMENT

Figure 1:
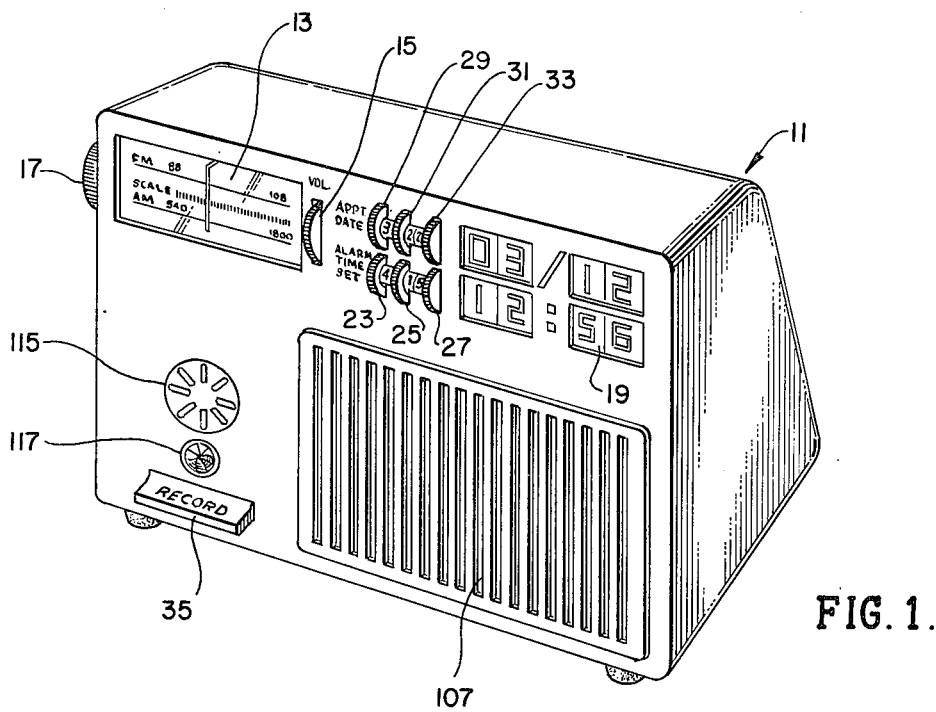
FIG. 1 is a perspective view of the alarm and recording system of the present invention incorporated in a clock radio.

Referring initially to FIG. 1, the alarm system 11 is embodied within a clock radio having a tuning dial 13, volume control knob 15, and turning control knob 17 as are commonly used in radio apparatus. In addition, the device includes a digital time and date output provided, for example, by the light emitting dial display 19 which may be constantly illuminated.

Located on the front panel of the clock 11 are three thumbwheel switches 23, 25, and 27 for setting the time of day at which the user wishes to be awakened. These switches may be used to designate the hour through switch 23, the 10 minute digit through switch 25, and the unit minute through switch 27, these switches providing positions for 1–12, 0–5, and 0–9 respectively. A wide variety of alarm set time devices are employed in digital clocks and watches and any of these devices may be used with the present apparatus 11, the thumbwheel switches 23–27 showing an exemplary form of apparatus for designating the time at which the user wishes to be awakened.

Also included on the front panel of the apparatus 11 is an appointment date selector comprising three thumbwheel switches 29, 31, and 33. As will be more fully understood in the description of the circuit given below, the thumbwheel switch 29 is used to designate the month during which a specific appointment schedule is to be replayed. Similarly, the switches 31 and 33 designate the specific tens and units digits, respectively, of the appointment date, the switches 29–33 providing positions for 1–12, 0–3, and 0–9, respectively. A record button 35 is also provided on the front panel of the apparatus 11 to operate a switch during the recording of appointment information.

Figure 2:
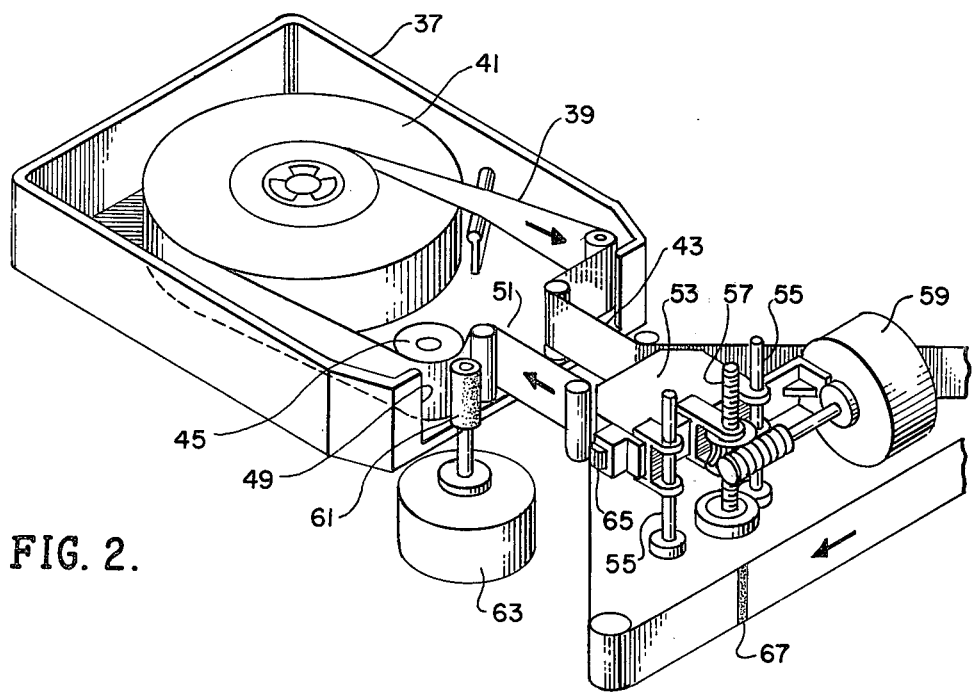
FIG. 2 is a perspective schematic view showing the use of an endless tape cartridge and movable recording and replay head mechanisms for recording and replaying appointment information.

Referring now to FIG. 2, a tape cartridge 37 is provided and mounted within the apparatus 11 and comprises and endless loop of magnetic recording tape 39 such as is commonly used in 8-track recording cartridges. This cartridge 37 provides a substantial coiled length of tape 41 and a loop of tape 43 drawn from the center of the coil 41 and replaced at the perimeter of the coil 41. A pressure roller 45 is provided within the cartridge 37 adjacent a frontal opening 49 in the cartridge 37. A second frontal opening 51 permits access to the tape by a record, erase, and playback head 53. The head 53 is movable along a pair of guides 55 to position the recording, playback, and erase gaps thereof adjacent one of the multiple recording tracks on the tape loop 43. A lead screw 57 connected to a motor 59 is used to position the head 53 along the guides 55 for recording track selection.

A capstan 61 bears agginst the tape loop 43 and pressure roller 45 to drive the tape loop 43 past the recording head 53. The capstan 61 is driven at a regulated speed by a motor 63. The apparatus shown in FIG. 2 is typical of that used for recording on endless loops of tape in 8-track recording systems except that the loop of tape 43 is drawn out through the gap 51, to provide a length of tape between the recording gap and playback gap which are on opposite sides of the recording head 53. Twelve tracks of recorded information are present on the tape loop 43. This may be accomplished by narrowing the track widths on a ¼ inch tape or by widening the tape to ⅜ inches to provide adequate separation of the recorded tracks. A switch 65 is mounted on the side of the recording head 53 and closes in response to the passage of metallic strips 67 present at spaced intervals on the tape 41, 43. Specifically, the tape 41, 43 is divided into 31 equal lengths, each providing 1 minute duration of recorded material. Thus, for example, if the capstan 61 is driven by the motor 63 to move the tape 43 at a rate of one inch per second, the tape 41, 43 will be 1,860 inches long to provide 31 equal, 60 inch tape segments, each separated from adjacent segments by a metallic strip 67 running perpendicular to the tape 41, 43. Such metallic tape segments 67 are commonly used in 8-track recording systems for operating switches, such as the switch 65.

Figure 3:
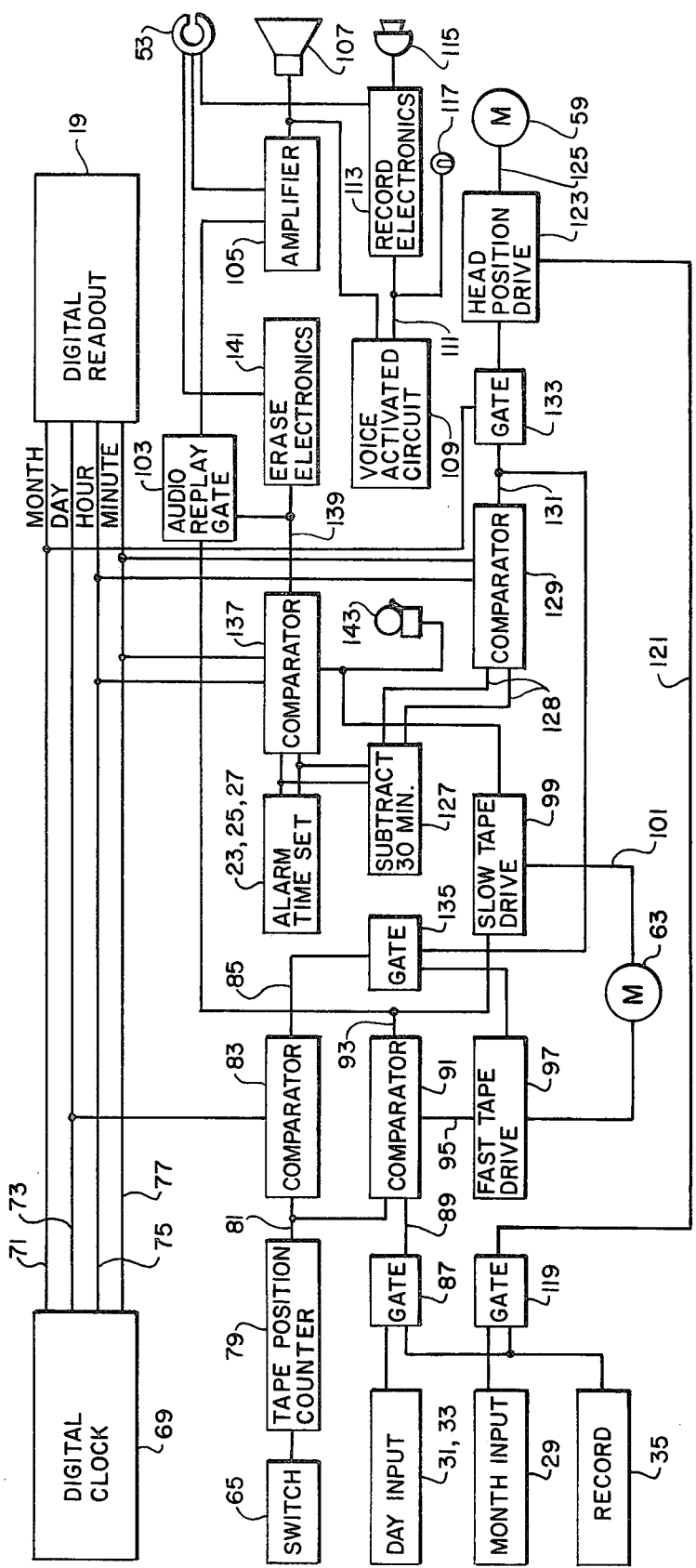
FIG. 3 is a schematic block diagram showing the electronic circuit used to operate the alarm and appointment calendaring system of the present invention.

Referring now to FIG. 3, the operation of the recording mechanism of FIG. 2 in response to manipulation of the controls on the front face of the digital clock of FIG. 1 will be described. The clock 11 includes a digital clock circuit 69 commonly available in the form of a large scale integrated circuit on a small semiconductor chip This clock circuit typically includes a high frequency oscillator and a plurality of dividers for producing a 1 Hz signal. This 1 Hz signal is accumulated in a counter to provide a count of seconds, and subsequent counters are utilized to accumulate minutes, hours, days, and months. A full calendaring system, including the appropriate number of days for each month, is included in many such clocks 69. The digital clock 69 provides digital data specifying the current month, day, hour, and minute on a plurality of output lines. This information is shown to be available on lines 71, 73, 75, and 77 respectively of FIG. 3, it being realized that multiple conductors may be required to provide the data for each of these lines. This simplification is utilized throughout FIG. 2. The lines 71–77, in typical fashion, are connected to the digital readout 19 which may, for example, include a multiplexer to provide a continuous designation of the current month, day, hour, and minute.

The switch 65 identified in reference to FIG. 2 closes and opens in response to the passage of each metallic strip 67 and is connected to a tape position counter 79 which repeatedly counts from 1–31 and resets, so that the position counter 79 is synchronized with the position of the tape 43, constantly producing on plural digital output lines designated by the line 81 a designation of the tape segment currently positioned adjacent the recording head 53. Through the use of the tape position counter 79, each of the 31 equal length segments of the tape 41, 43 is designated by the output line 81 as relating to a specific day of the month, numbered from 1–31. As previously stated, the tape 41, 43 has 12 tracks. Each track provides recorded appointment information for a specific month, so that, for example, the first track on the tape 41, 43 may be used to store appointment information for January, the second track for Feb. etc. Thus, each segment of each track is designated for the storage of appointment information for a particular day of the year, the third longitudinal segment between metallic strips 67, that is, the segment positioned adjacent the recording head 53 when the tape position counter 70 outputs a binary designtion of the numeral 3 on line 81, being used for storing appointment information for Jan. 3rd.

A compartor circuit 83 is connected to the line 73 to produce an output on line 85 when the tape position counter 79 indicates that the tape 41, 43 is positioned with the current day of the month, as designated by the line 73, adjacent the recording head 53. A gate 87 connected to the record button 35 and the day input switches 31, 33, provides an output signal on line 89 to a comparator circuit 91. When the record button 35 is pushed, the comparator 91 compares the positions of the switches 31, 33 with the current tape position as designated by the signal on line 81 and produces an output signal on line 93. When the tape 41, 43 is positioned with the day of the month segment identified in the day input switches 31, 33 adjacent the record head 53, a second output 95 of the comparator 91 produces a positive signal whenever the record button 35 is pushed and the tape position counter 79 indicates that the tape 41, 43 is in a position other than that designated by the day input switches 31, 33, and this signal is used to operate motor control electronics 97 for driving the motor 63 to advance the tape 41, 43 at a rapid speed past the record head 53 and switch 65, the fast advance being immediately discontinued when the comparator 91 interrupts the signal on line 95 indicating that the tape position counter 79 has advanced to the position designated by the day input 31, 33. Thus, if a user wishes to record information for a specific day, he will select the day of the month using the switches 31, 33 and will depress the record button 35, rapidly advancing the tape through the motor control circuit 97 until the tape has reached the position designated by the switches 31, 33. Once the tape has reached the proper day of the month, the comparator 91 will interrupt the signal on line 95 and will produce a signal on line 93 to energize motor control electronics 99 connected by a line 101 to the motor 63 to drive the tape 41, 43 forward at the designated, accurately controlled recording speed. Simultaneously, the signal on the line 93 will activate an audio replay gate 103 energizing an amplifier 105 connected to the replay gap of the tape head 53 to replay to a speaker 107 situated in front of the apparatus 11 any information previously recorded in this tape segment. The output audio signal from the amplifier 105 is also used to control a voice activated circuit 109 with a short delay. This circuit 109 will monitor the output audio signal from the amplifier 105 and will produce a signal on line 111 if the amplifier 105 is activated and produces no output audio signals during any time period of 5 seconds duration. Thus, the prerecorded messages already on this tape segment will be played to the user and as soon as all such messages have been played, as indicated by a 5 second gap in the recorded message, the signal will be present on line 111, this signal activating record electronics 113 within the apparatus, these electronics 113 connected to the record gap of the tape head 53 and in addition to a microphone 115 shown also in FIG. 1 for recording the appointment messages for the date designated by the switches 31, 33. At the same time, the output on line 111 illuminates an indicator light 117 to notify the user that the system is ready to accept for recording his new appointment information.

The output of the month input switch 29 is connected through a gate 119 controlled by the record switch 35 to produce an output signal on a line 121 connected to a head position drive circuit 123 used to operate the motor 59 to position recording head 53 at the recording track on the tape 41, 43 used for recording information for the month selected by the switch 29. The output on line 121 may be, for example, a binary coded signal, and the head position drive 123 may convert this signal to an analog output on a line 125 to the motor 59 for accurately positioning the tape head 53.

From the previous description, it can be seen that an operator wishing to record information to be played on a specific date will select the month and day on which the information is to be played using switches 29, 31, 33. The operator will then depress the record button 35 which, through the counter 79, comparator 91, and motor drive 97 will rapidly advance the tape to the day of the month segment which has been selected. Simultaneously, the head position drive circuit 123 will move the record head 53 to the month track selected by the month input switch 29. Once the proper tape segment has been reached, the comparator 91 will automatically activate the slow tape drive 99 to drive the tape forward at its normal record speed, the gate 103 activating the amplifier 105 to replay any messages previously recorded for that date. Once a blank segment of tape 5 seconds in duration has been reached, the record electronics 113 will be autmotically activated and the indicator light 117 illuminated, indicating to the user that he should dictate the message which he wishes to add for the specific day and month selected by the switches 29, 31, and 33. Many such messages may thus be accumulated for a specific day, the total duration in this specific embodiment being 1 minute per day. So that, for for example, for 10 second messages could be recorded, each message being separated by a 5 second tape gap. In this regard, it is helpful if the replay gap is positioned substantially forward of the record gap, so that the moving tape first moves by the replay gap and then moves by the record gap. Thus, the replay gap may monitor a 5 second pause, indicating no more recorded messages exist on the segment, and the recording gap may immediately begin recording without sny substantial gap if, for example, there is a 5 second space between these two heads. In this manner also, the gaps between messages recorded at different times will be substantially less than 5 seconds in duration, so that when a new message is to be recorded, gaps between prior messages will not be interpreted by the equipment as an indication that no more recorded messages exist in the tape segment.

The difference in position in the record and playback gaps may be provided, for example, by drawing the substantial loop of tape 43 out from the gap 51 as shown in FIG. 2, the tape at one end of the loop passing by the record head and at the other end of the loop passing by the playback head, the remainder of the loop guided by rollers to include a predetermined length of tape between these two heads.

As stated previously, the time of day at which an alarm is to be sounded to awaken the individual using this system is set by the thumbwheel switches 23, 25, and 27. The alarm will thus sound daily, and each day will play whatever messages have been prerecorded into the system for thay day. This is accomplished by connecting the thumbwheel switches 23, 25, and 27 to a subtraction circuit 127 which operates to produce digital signals on output lines 128 equivalent to a time 30 minutes prior to the alarm set time designated by the switches 23-27. This 30 minute prior time is compared in a comparator circuit 129 with the hour and minute outputs on lines 75 and 77 from the digital clock 69, so that at a time 30 minutes prior to the time when the alarm is to sound, the compartor 129 outputs a signal on line 131. This signal operates to control a gate 133 also connected to the month output line 71 from the digital clock 69. Once gated, the signal from the month line 71 operates the head position drive 123, previously described, to move the recording head 53 to the proper track for the current month. In addition, at this 30 minutes prior to the alarm set time, the output from the comparator circuit 129 operates a gate 135 to enable signals from the compartor 83 to pass to the fast tape drive 97. As previously explained, once enabled by the gate 135, the comparator 83 will output a signal on line 85 so long as there is a difference in the output of the tape position 97 and the current day of the month as monitored by line 73. The fast tape drive 97 will thus operate the motor 63 to advance the tape to the appropriate day segment 30 minutes before alarm time. When the actual time preset for sounding the alarm is reached, a comparator 137 connected to the hour and minute lines 75 and 77 from the digital clock 69 and connected to the alarm time set switches 23, 25, and 27 produces an output on line 139 to energize the audio replay enable gate 103 previously described and to simultaneously energize erase electronics 141 which are connected to the tape head 53. The erase gap of the tape head 53 advantageously follows the playback head, so that, after the messages of the day are played back, they are automatically erased, leaving the day segment free to record messages in the future for this same date, one year in the future. The audio replay enable gate 103 will activate the amplifier 105, as previously described, and the indicator light 117 will be illuminated at the end of the messages. The recording electronics 113 will automatically be activated at the end of the prerecorded messages, but anything recorded will be immediately erased by the erase electronics 141 and therefore not permanently entered on the magnetic tape.

The comparator 137 may also be used to sound a short audible alarm 143 prior to the playback of prerecorded messages.

The system described in this application therefore permits the user, at times which he selects, to prerecord messages and to input, through switches 29, 31, and 33, data indicating the day on which he wishes the messages to be played back after his alarm has awakened him. Several messages may be prerecorded at different times to play on a single day and, depending on the size of tape which is used, a predetermined time allotment is provided for each day, 1 minute in the exemplary embodiment described herein. After the messages have been played, they are automatically erased. It should be understood that a replay circuit may be included to allow the user to replay his messages after he awakens. In this instance, a time delay circuit will be included to later erase the messages recorded for the given day.

As another embodiment of this invention, it is possible to record messages on a separate tape which may be operated at any time by the operator, messages being accumulated on this tape in no particular sequence. At some time prior to the operation of the alarm, that is, in the middle of the night, these messages may then be automatically transcribed onto the proper month and day portion of the tape, so that the operator need not wait to record his messages.

What is claimed is:

1. An alarm clock, comprising:
   means for recording plural spoken messages comprising:
      means for inputting a signal representing a date on which said messages are to be played; and
      means for generating signals in response to a human voice for recording on a storage medium, each such recording corresponding to a signal representing a date; and
   alarm means for playing back informtion recorded on said storage medium corresponding to a given date on said given date; and
   means for automatically eliminating from said storage medium said information following the playback of said information on said given date.

2. An alarm clock as defined in claim 1 wherein:
   said means for recording plural spoken messages records plural messages at different times all corresponding to a single signal representing a date.

3. An alarm clock as defined in claim 1 wherein said recording means additionally comprises:
   a magnetic tape separated into segments corresponding to a given date; and
   means for recording said signals responsive to a human voice on that portion of said magnetic tape corresponding to said signals representing a date.

4. An appointment calendaring system, comprising:
   a tape recorder for recording plural spoken appointment messages, each message identified by a date on which it is to be replayed;
   means for automatically replaying the messages identified to correspond to a given date on said given date; and
   means for automatically leaving that portion of said tape corresponding to said date void of said messages following said date.

5. An appointment calendaring system as defined in claim 4 wherein:
   said recorder records plural messages at different times each identified by the same date and wherein said means for automatically replaying replays said plural messages in succession on said same date.

6. An appointment calendaring system as defined in claim 4 wherein:
   said means for automatically replaying comprises means for presetting the time of day at which said messages will be replayed.

7. An appointment calendaring system as defined in claim 4 wherein:
   said tape recorder includes a tape broken into segments, each segment corresponding to a particular date.

8. An alarm clock comprising:
   means for presetting a time of day at which said clock awakens a user;
   means for playing a prerecorded audio message at said preset time of day; and
   means for recording and simultaneously storing plural said prerecorded audio messages, each such message identified by a different date for playing.

9. An alarm clock as defined in claim 8 wherein:
   said recording means records plural prerecorded audio messages identified by the same date for playing.

10. An alarm clock as defined in claim 9 wherein:
    said plural prerecorded messages identified by the same date are recorded by said recording means at different times.

11. An alarm clock, comprising:
    a tape recorder for recording plural spoken messages, each message identified by a date on which it is to be replayed;
    means for automatically playing back prerecorded messages corresponding to a given date each time said tape recorder records additional messages corresponding to said given date; and
    means for automatically replaying the messages identified to correspond to a given date on said date.

12. An alarm clock, comprising:
    a tape recorder for recording plural spoken messages, each message identified by a date on which it is to be replayed, said tape recorder comprising:
       a magnetic tape separated into segments corresponding to a given date; and
       means for automatically locating and preparing to replay said portion of said magnetic tape corresponding to said date on said date; and
    means for automatically replaying messages found on said portion of said magnetic tape corresponding to said date on said tape.

13. An alarm clock as defined in claim 12 wherein:
    said magnetic tape is asynchronous with the clock mechanism.

* * * * *

UNITED STATES PATENT AND TRADEMARK OFFICE
CERTIFICATE OF CORRECTION

PATENT NO. : 4,070,697
DATED : January 24, 1978
INVENTOR(S) : Leonard W. Miller and James B. Bear It is certified that error appears in the above-identified patent and that said Letters Patent are hereby corrected as shown below:

Column 2, line 49, change "and" to --an--; line 64, change "agginst" to --against--.

Column 3, line 29, add a period after "chip" and before "This".

Column 4, line 1, change "70" to --79--; line 5, change "compartor" to --comparator-- and change "73" to --81 and line--

Column 5, line 32, delete second occurrence of "for"; line 33, change "for" to --four--; line 41, change "sny" to --any--; line 63, change "thay" to --that--.

Column 6, line 4, change "compartor" to --comparator--; line 13, change "compartor" to --comparator--.

Column 7, line 10, change "informtion" to --information--.

Signed and Sealed this

Sixth Day of June 1978

[SEAL]

Attest:

RUTH C. MASON
Attesting Officer

DONALD W. BANNER
Commissioner of Patents and Trademarks